US012548397B2

(12) United States Patent
Perrow

(10) Patent No.: US 12,548,397 B2
(45) Date of Patent: Feb. 10, 2026

(54) SYSTEMS AND METHODS FOR AN ELECTRONIC GAMING MACHINE EMPLOYING EYE GAZE TRACKING SYSTEM TO ANIMATE REEL SYMBOLS AND GENERATE VIDEO CONTENT

(71) Applicant: Aristocrat Technologies Australia Pty Limited, North Ryde (AU)

(72) Inventor: Shane Perrow, Kembla Heights (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 287 days.

(21) Appl. No.: 18/322,382

(22) Filed: May 23, 2023

(65) Prior Publication Data

US 2023/0386289 A1    Nov. 30, 2023

Related U.S. Application Data

(60) Provisional application No. 63/345,541, filed on May 25, 2022.

(51) Int. Cl.
*G07F 17/34* (2006.01)
*G06F 3/01* (2006.01)
*G06V 40/18* (2022.01)
*G07F 17/32* (2006.01)

(52) U.S. Cl.
CPC .......... *G07F 17/3213* (2013.01); *G06F 3/013* (2013.01); *G06V 40/18* (2022.01); *G07F 17/3206* (2013.01)

(58) Field of Classification Search
CPC . G07F 17/3213; G07F 17/3206; G06V 40/18; G06F 3/013
See application file for complete search history.

(56) References Cited

U.S. PATENT DOCUMENTS

| | | | | |
|---|---|---|---|---|
| 9,606,622 | B1* | 3/2017 | Brothers | G06F 3/013 |
| 10,421,010 | B2 | 9/2019 | Nguyen | |
| 2009/0264195 | A1* | 10/2009 | Kompella | G07F 17/323 |
| | | | | 463/31 |
| 2012/0322542 | A1* | 12/2012 | Chudd | G07F 17/3216 |
| | | | | 463/25 |
| 2013/0023337 | A1* | 1/2013 | Bowers | G07F 17/3209 |
| | | | | 463/25 |
| 2013/0050070 | A1* | 2/2013 | Lewis | G06F 3/013 |
| | | | | 351/210 |
| 2016/0050391 | A1* | 2/2016 | Schultz | H04L 65/1083 |
| | | | | 348/14.07 |
| 2016/0093136 | A1* | 3/2016 | Lyons | G07F 17/3237 |
| | | | | 463/31 |
| 2017/0344112 | A1* | 11/2017 | Wilson | G06F 3/0304 |

* cited by examiner

*Primary Examiner* — David L Lewis
*Assistant Examiner* — Shauna-Kay Hall
(74) *Attorney, Agent, or Firm* — Weaver Austin Villeneuve & Sampson LLP

(57) ABSTRACT

Disclosed are gaming systems, methods and machines that include one or more eye gaze tracking systems. In particular, the eye gaze tracking system may be incorporated with a gaming system, or located with a gaming environment and otherwise connected to a gaming system. When the focus of the user's gaze is identified, the gaming system can activate a response in the feature associated with the user's gaze. This can include a virtual feature on a display screen or a feature, such as lighting or signage, on the gaming system or within the gaming environment.

20 Claims, 10 Drawing Sheets

SYSTEMS AND METHODS FOR AN ELECTRONIC GAMING MACHINE EMPLOYING EYE GAZE TRACKING SYSTEM TO ANIMATE REEL SYMBOLS AND GENERATE VIDEO CONTENT

RELATED APPLICATION(S)

The present application claims priority to U.S. Provisional Patent Application No. 63/345,541, filed May 25, 2022, and entitled "Systems And Methods For An Electronic Gaming Machine Employing Eye Gaze Tracking System To Animate Reel Symbols And Generate Video Content" which is hereby incorporated by reference in its entirety.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency, or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

SUMMARY

This disclosure relates generally to eye gaze tracking systems for gaming systems and methods of employing eye gaze tracking system in gaming systems. In particular, disclosed systems and methods provide for eye gaze tracking hardware and software integrated with and/or connected to a gaming machine to enhance a number of potential applications, including animating symbols and other features in response to a user input associated with a player's eye gaze.

In disclosed examples, an electronic gaming system includes an eye gaze tracking system operable to detect movement of an eye of a user. A display presents text or icons to the user. A gaming cabinet includes one or more dynamic features. And control circuitry is operable to receive one or more images of the user's eye; determine a position of the user's eye; determine a focus of the user's eye on the text or icons of the display or the dynamic features of the gaming cabinet based on the position of the user's eye; and control the text, the icons, or the dynamic features to change based on the focus of the user's eye.

In some examples, the control circuitry is further operable to determine the focus of the user's eye to be on a dynamic feature of the one or more dynamic features; and control a characteristic of the dynamic feature to change in response to the focus. In examples, the one or more dynamic features include cabinet lighting, a button, a physical reel, or a player interface. In examples, the one or more dynamic features are operable to change a position, an orientation, a color, a level of illumination, a pattern of illumination, or speed of movement.

In some examples, the eye gaze tracking system is further operable to perform a calibration operation to determine an initial position of the user's eye.

In examples, the one or more text or icons include one or more reels provided on the display, the control circuitry operable to determine the focus of the user's eye to be on a reel of the one or more reels; and control a characteristic of the reel to change in response to the focus. In examples, the characteristic is one of a position, an orientation, a color, a level of illumination, a pattern of illumination, or speed of movement.

In some examples, the one or more text or icons include one or more reels provided on the display, the control circuitry further operable to determine the focus of the user's eye to be on a first reel of the one or more reels; control a first characteristic of the reel to change in response to the focus; determine the focus of the user's eye to change to a second reel of the one or more reels; and control a second characteristic of the second reel to change in response to the change in the user's focus. In examples, the eye gaze tracking system includes one or more cameras.

In some examples, the eye gaze tracking system is arranged on the cabinet such that the one or more cameras are within line of sight of the user's eye. In examples, the system includes an electromechanical actuator in connected to the one or more dynamic features, the electromechanical actuator operable to vibrate, depress, extend, or rotate in response to the eye's focus on a corresponding dynamic feature.

In examples, the text or icons of the display include a game symbol, a game icon, a virtual reel, a symbol on a virtual reel, a video poker card or game, or a player interface.

In some disclosed examples, an electronic gaming machine includes a display screen to present text or icons, a gaze tracking system operable to recognize a user's eyes at a range of angles measured from a surface of the display screen, control circuitry operable to receive and process data from the gaze tracking system, and a control processor operable to execute instructions based on the recognized location of the user's eye gaze, thereby controlling presentation of the text or icons on the display screen.

In some examples, the range of angles span from approximately 90 to 270 degrees as measured from a plane passing through the eyes and the screen. In examples, the control processor is operable to execute instructions to alter a location or state of the text or icons displayed on the display screen. In examples, the control processor is operable to execute instructions to filter out non-human eye stimuli and identify human eyes from data received from the gaze tracking system.

In some disclosed examples, an electronic gaming device with an eye gaze tracking system includes a display screen to present text or icons, a gaze tracking system operable to recognize a user's eyes, a game controller including a processor and memory, the memory storing program code including instructions, the game controller executing the instructions which cause the game controller to, at least capture images of the user's eyes via a camera of the eye gaze tracking system, analyze the images to detect a focus of the user's eye gaze or movement of the user's eyes, determine a position of the user's eyes, identify a focal point of the user's eyes on the display screen based on the determined position, and adjust what is displayed on the display screen based on the identified focal point.

In some examples, adjusting what is displayed on the display screen includes selecting a menu item including options corresponding to text or icons corresponding to the identified focal point. In some examples, adjusting what is displayed on the display screen includes controlling a cursor position on the display screen based on the identified focal point. In some examples, adjusting what is displayed on the display screen includes spinning, illuminating, changing a size of text or icons on the display screen based on the identified focal point.

DETAILED DESCRIPTION

Figure 1:
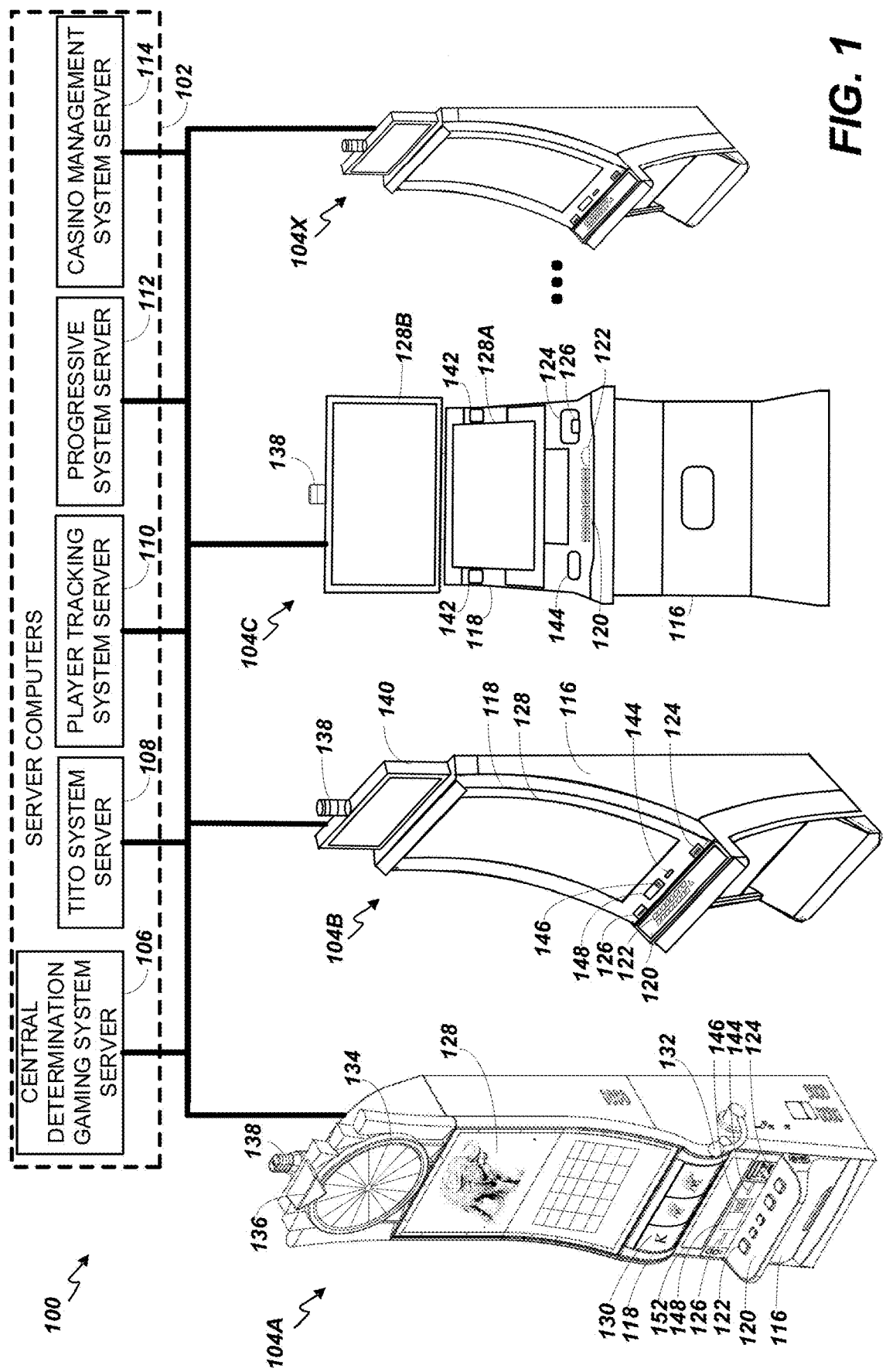
FIG. 1 is an exemplary diagram showing several EGMs networked with various gaming related servers.

Disclosed are systems and methods for gaming systems, where machines therein include one or more eye gaze tracking systems. In particular, the one or more eye gaze tracking systems may be incorporated with a gaming system or located with a gaming environment and otherwise connected to a gaming system.

In disclosed examples, eye movement and gaze tracking hardware and software can be used to seamlessly control and influence onscreen activity in a variety of applications, including entertainment and gaming. For instance, hardware and software for the one or more eye gaze tracking systems may be physically incorporated with a gaming machine (e.g., mounted thereto, formed on a portion of a gaming cabinet, incorporated with a display, etc.) to implement any number of potential applications.

In operation, the one or more eye gaze tracking systems capture information pertaining to a user's eye position and determine a focus of the user's gaze with respect to a corresponding feature on the gaming system and/or within the gaming environment. Once the corresponding feature is identified, the feature has one or more characteristics that can be controlled to undergo a change, such as a change in position, orientation, color, level of illumination, pattern of illumination, and/or speed of movement, as a listing of non-limiting examples.

For instance, the one or more eye gazing systems can detect when a player looks at a reel symbol presented on a display screen on the gaming system, and the reel responds by a characteristic of the reel undergoing a change, wherein the change can include, but not limited to, animation, rotation, change in color, and flashes. This response provides players with an interesting sense of engagement with the gaming system. For example, as a player turns to view a static display screen with reel symbols waiting to be spun, one or more reel symbols start to animate and the one or more animations change or stop as the user's attention is diverted, as detected by the one or more eye gazing systems. Moreover, the one or more eye gazing systems are configured to: (1) monitor an area for a single user or multiple users; (2) identify, follow, and/or respond to gaze focus from the single user or the multiple users (i.e., two or more users); and (3) instruct a gaming system to activate features in response to the gaze focus from the single user or multiple users that have been identified, followed, and/or responded to. In some examples, some features can only be activated by the identified, followed, and/or responded to gaze focuses of multiple users (e.g., edge lighting) at a time, whereas some features can only be activated by the identified, followed, and/or responded to gaze focus of a single user at a time (e.g., activation or identification of a gaming feature). Stated another way, the one of more eye gaze tracking systems can distinguish between instances of a single user engaging with the gaming system or multiple users engaging with the gaming system.

In some examples, a game feature mode presents players with a "pick a box" type activity. Employing the disclosed one or more eye gaze tracking systems, each box begins to animate only when a player's focus is on the box, wherein the player's focus is on the box detected by the one or more eye gaze tracking systems; or each box animates as the players' eyes scan across the selection of boxes to view one or more revealing characteristics of each box before selecting one (e.g., with a touchscreen, selection button, etc.), wherein the players' eyes scan across the selection of box is detected by the one or more eye gaze tracking system.

The one or more eye gaze tracking systems is operationally connected to a gaming system. In some examples, a player's focus can shift, such as a player's eyes drift to the screen perimeter or away from the display screen to the gaming cabinet's edge lighting, which is identified or determined by the one or more eye gaze tracking systems. In response to the one or more eye gaze tracking systems determining or identifying the shift in the players' focus, then the edge lighting or a portion of the gaming system can undergo a change, wherein the change can include, but is not limited to, a sparkle, a flash, a change of color, and/or a flicker corresponding to the player's focus and/or shift in the player's focus. This gives players an interesting sense of engagement and interaction with the gaming system. In some examples, the one or more eye gaze tracking systems can be used to customize the displayed static and/or video content, as well as a tactile and/or audio experience.

In conventional gaming systems, players are limited to physical interaction with casino gaming products by very consciously pressing physical buttons or making selections on touchscreens. The one or more eye gaze tracking systems can: (1) identify the focus of the user's gaze and shift of the user's gaze, wherein the focus of user's gaze and the shift of the user's gaze are made without a conscious action; and (2) trigger corresponding features that can be activated in the gaming system. Identification of the focus of the user's gaze is made without a conscious action, including as the eye focus moves. The one or more eye gaze tracking systems add an engagement layer to the human interaction with the gaming system that can be much more subtle and responsive than conventional gaming systems.

A provided herein, the one or more eye gaze tracking systems are measuring either the focus of a user's gaze (e.g., where the user is looking) or the movement of the user's eye (e.g., from an initial calibration point, relative to a position or orientation of the user's head, etc.).

The one or more eye gaze tracking systems may employ cameras to capture and measure eye position and/or motion, thereby: (1) capturing images of the user's eye or otherwise sensed by the cameras (e.g., a video camera or some other optical sensor); and (2) analyzing the image information to determine eye position or movement. From the image information, the user's focus may be determined by the one or more eye gaze tracking systems. When coordinated with another system, such as a gaming system, features of the other system may be determined to correspond to the user's focus. Once the corresponding features are determined, one or more changes to the feature can be implemented, such as movement or other animation. This process may be implemented via control circuitry incorporated with the one or more eye gaze tracking systems, the other system (e.g., gaming system), and/or a combination of the two.

In some examples, a feature corresponding to the user's focus may animate may offer a choice of selection, such as a wager amount or game option. Confirmation of such a selection may require a secondary action, such as a user input on a bash button or touchscreen, via voice, and/or visual input such as blinking.

Advantageously, features responsive to eye gaze inputs will attract new players because of the result and uniqueness of engagement. Further advantages include simplicity of design and assembly, enhanced serviceability, and simple and efficient retrofitting of existing gaming platforms with an eye gaze tracking system, all of which reduces cost of production and/or maintenance of an interactive gaming machine. Moreover, identification of a user's eye gaze, and subsequent activation of the corresponding gaming machine, are done without collection of personal user data, including biometric information, thereby maintaining anonymity of users.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementations, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL' model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
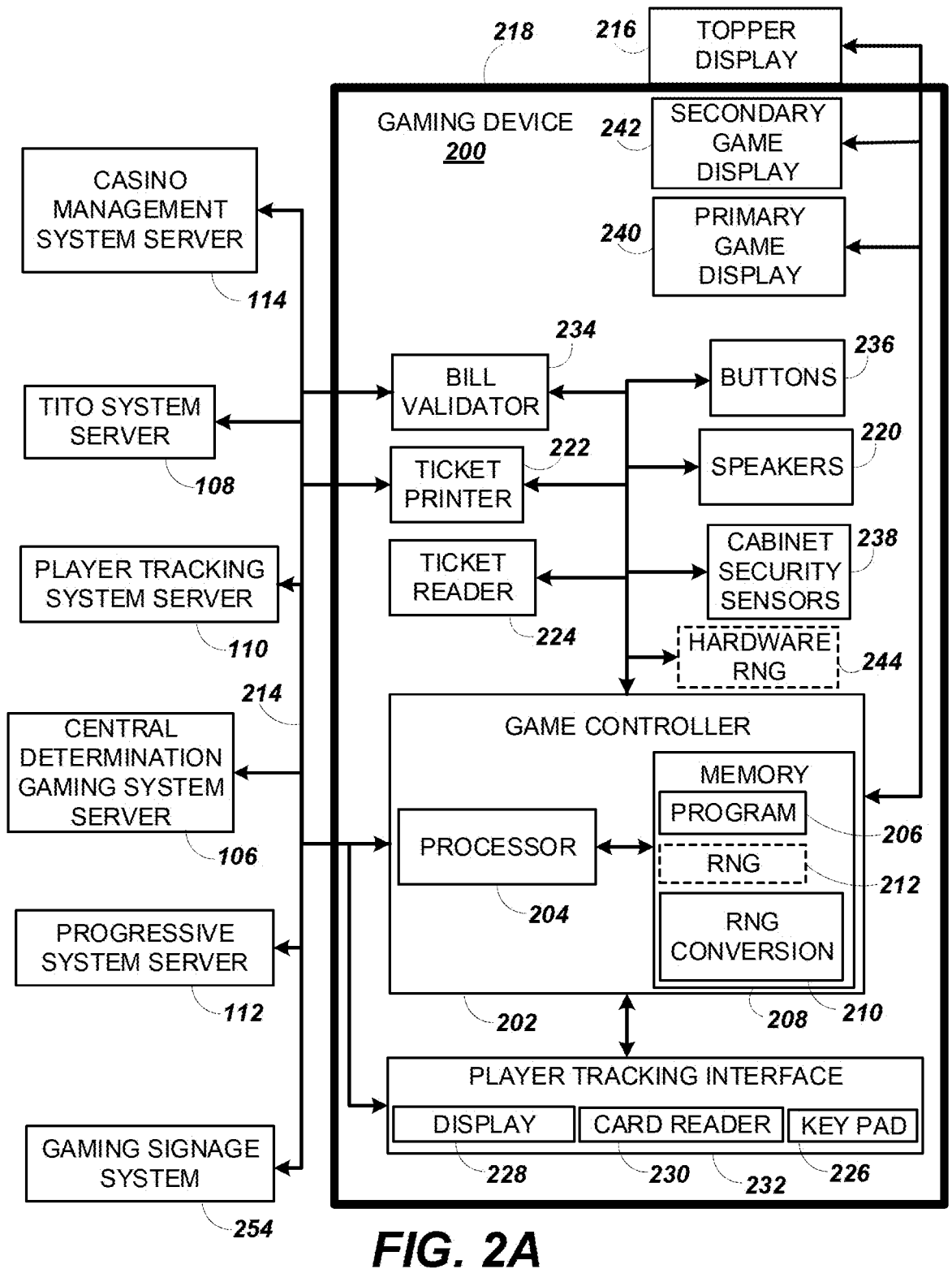
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218.

Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
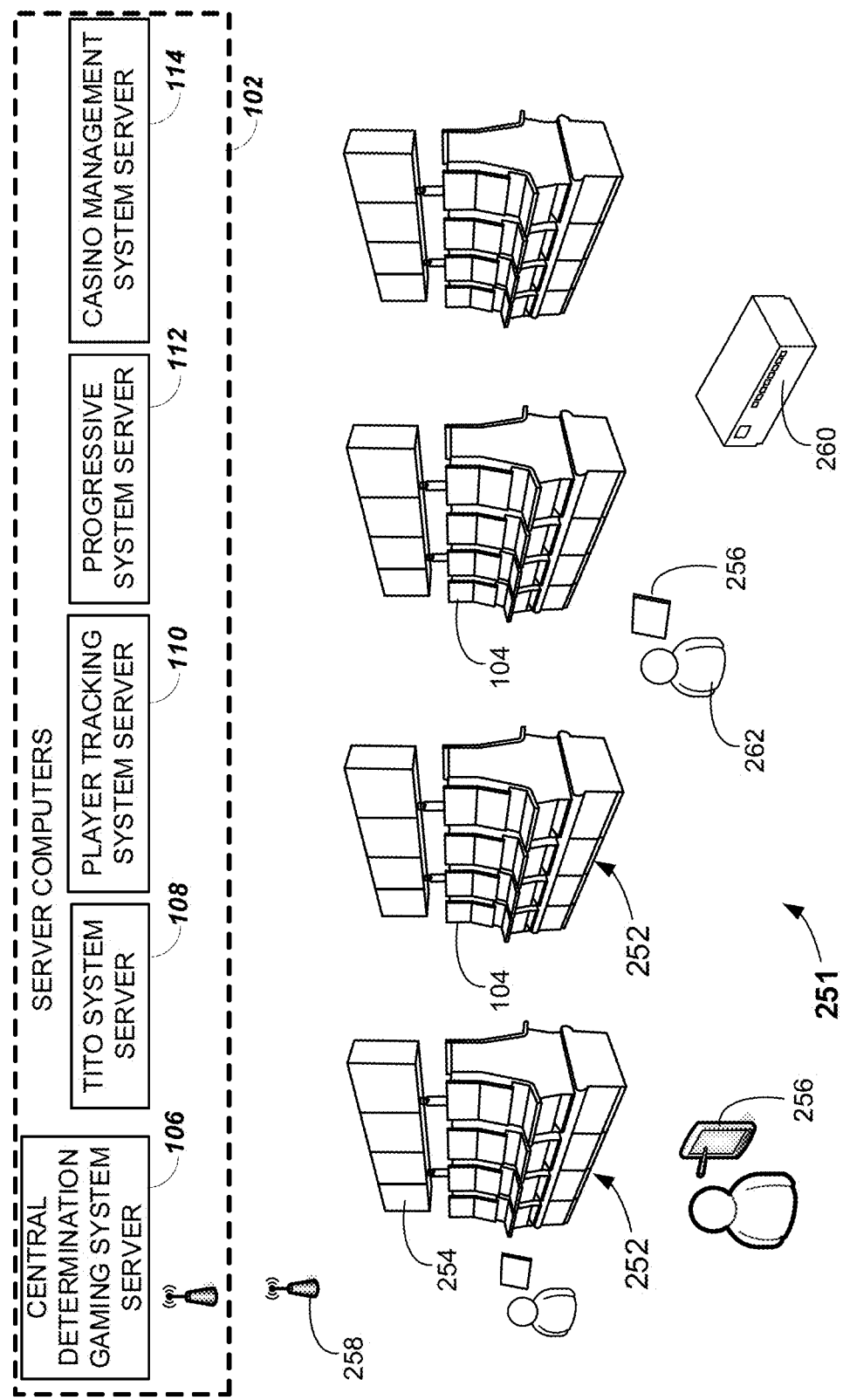
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
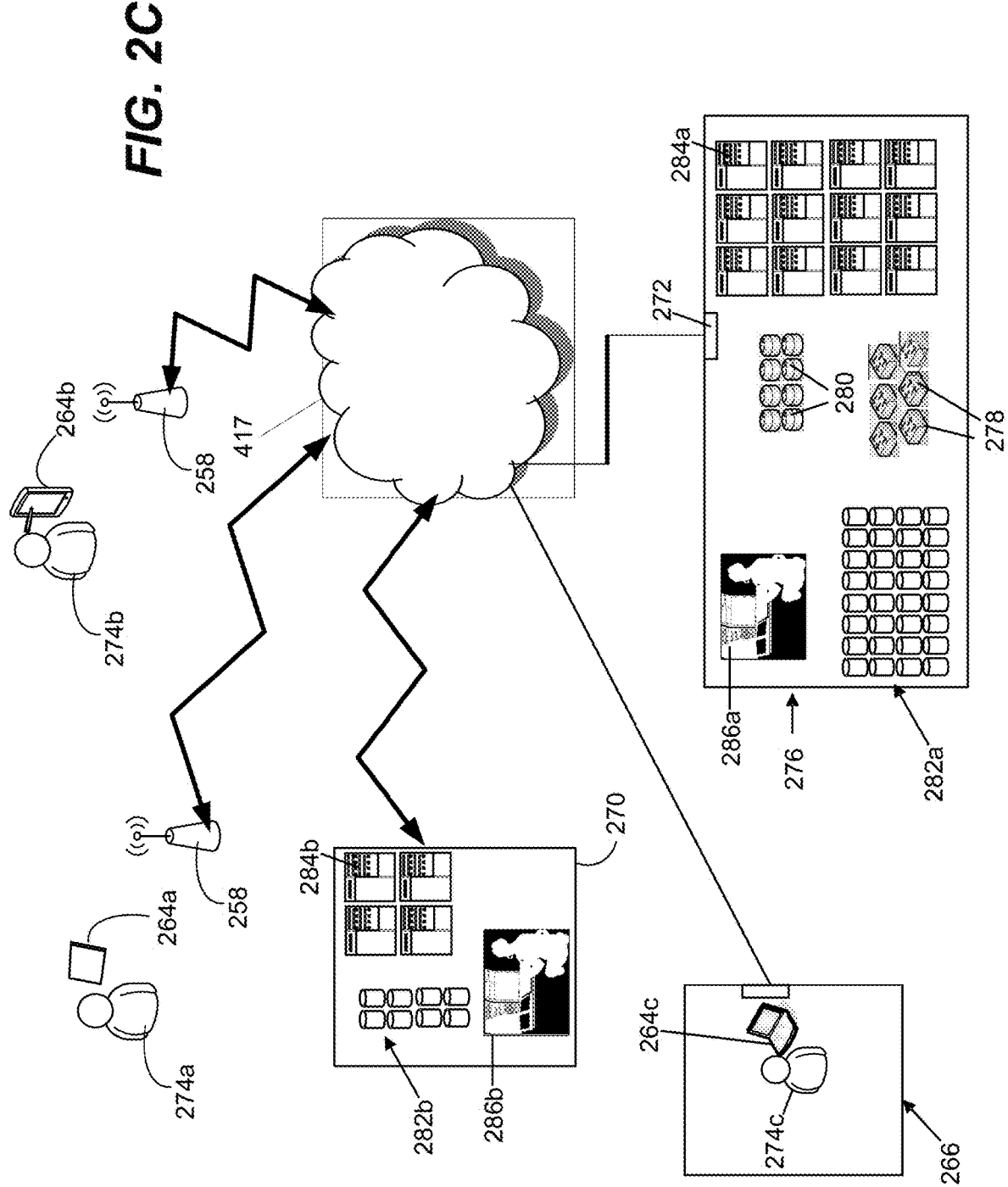
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types, and arrangements of gaming devices shown in FIG. 2C are merely shown by way of example. In this example, various gaming devices, including but not limited to end user devices (EUDs) 264a, 264b and 264c are capable of communication via one or more networks 417. The networks 417 may, for example, include one or more cellular telephone networks, the Internet, etc. In this example, the EUDs 264a and 264b are mobile devices: according to this example the EUD 264a is a tablet device and the EUD 264b is a smart phone. In this implementation, the EUD 264c is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282a, servers 284a and one or more workstations 286a. The servers 284a may, for example, be configured to provide access to a library of games for online game play. In some examples, code for executing at least some of the games may initially be stored on one or more of the storage devices 282a. The code may be subsequently loaded onto a server 284a after selection by a player via an EUD and communication of that selection from the EUD via the networks 417. The server 284a onto which code for the selected game has been loaded may provide the game according to selections made by a player and indicated via the player's EUD. In other examples, code for executing at least some of the games may initially be stored on one or more of the servers 284a. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284b, storage devices 282b, and one or more workstations 286b. According to this example, the financial institution data center 270 is configured to maintain financial accounts, such as checking accounts, savings accounts, loan accounts, etc. In some implementations one or more of the authorized users 274a-274c may maintain at least one financial account with the financial institution that is serviced via the financial institution data center 270.

According to some implementations, the gaming data center 276 may be configured to provide online wagering games in which money may be won or lost. According to some such implementations, one or more of the servers 284a may be configured to monitor player credit balances, which may be expressed in game credits, in currency units, or in any other appropriate manner. In some implementations, the server(s) 284a may be configured to obtain financial credits from and/or provide financial credits to one or more financial institutions, according to a player's "cash in" selections, wagering game results and a player's "cash out" instructions. According to some such implementations, the server(s) 284a may be configured to electronically credit or debit the account of a player that is maintained by a financial institution, e.g., an account that is maintained via the financial institution data center 270. The server(s) 284a may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274a-274c), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
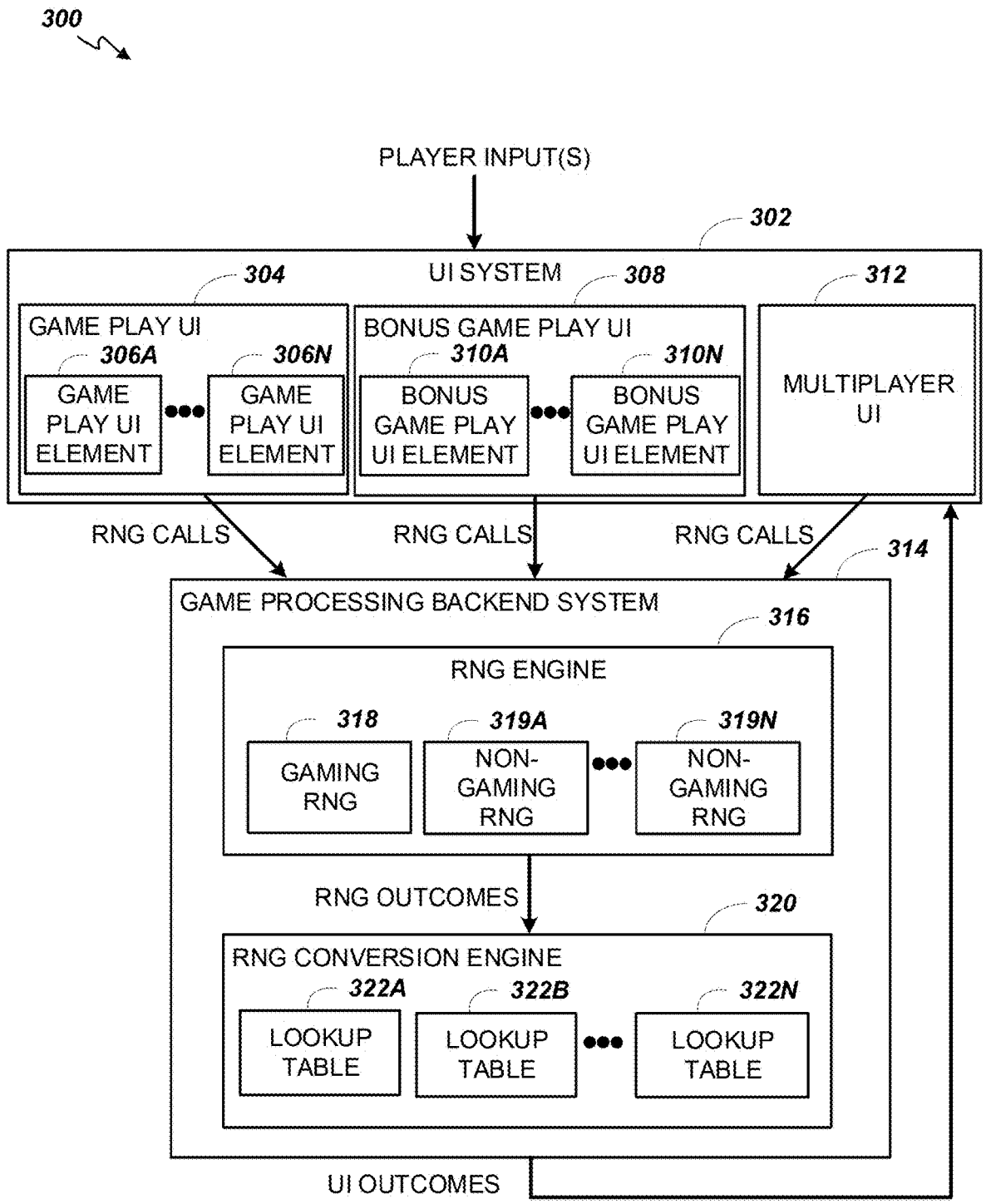
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could correspond to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Figure 4A:
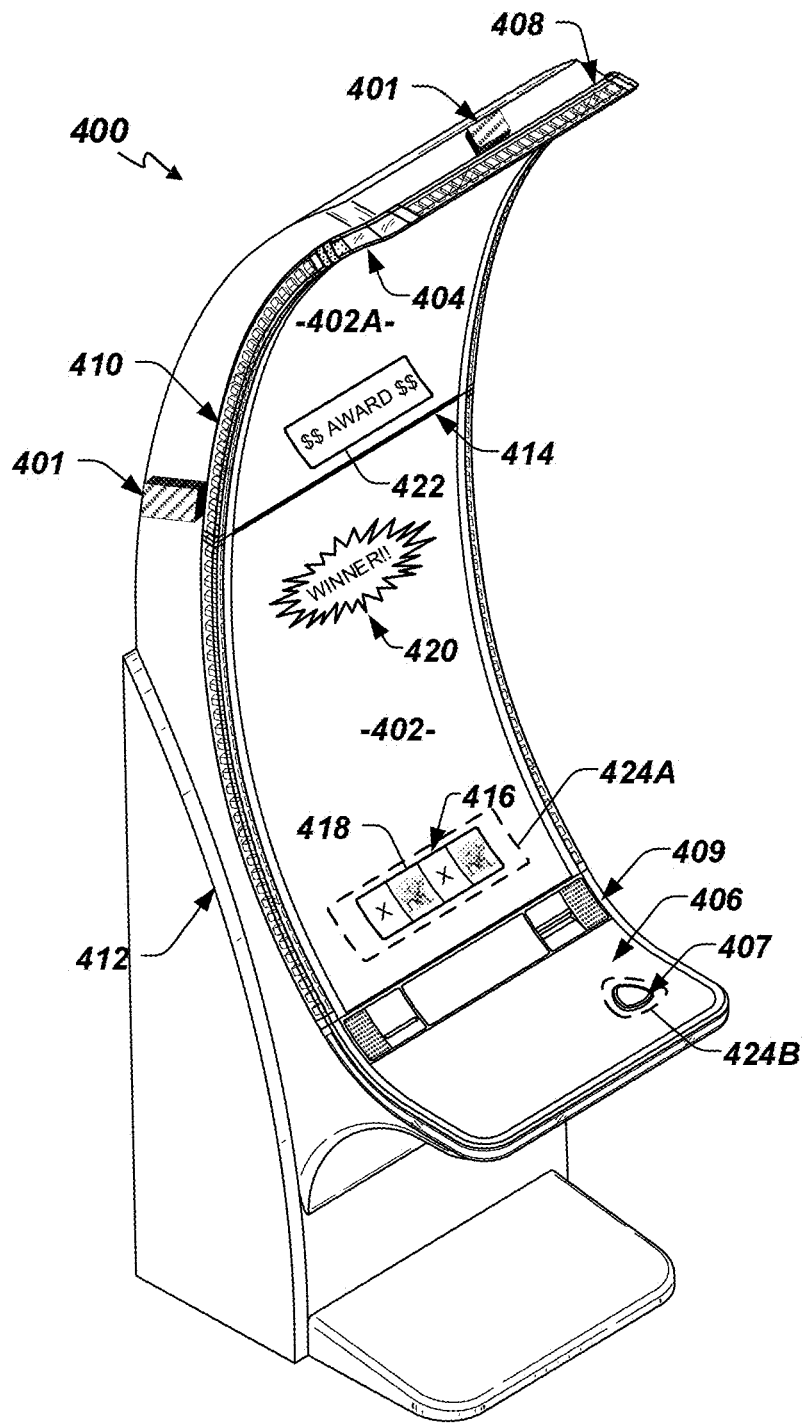
FIG. 4A illustrates a gaming cabinet employing an eye gaze tracking system according to some aspects of the present disclosure.

FIG. 4A illustrates an electronic gaming machine 400 employing the one or more eye gazing tracking systems, such as an eye gaze tracking system 401, according to some aspects of the present disclosure. In the example of FIG. 4A, the gaming machine 400 includes dual curved display screens 402, 402A (e.g., 49" 4K display) with a Virtual Button Deck (VBD) 406. As shown, the display screens 402, 402A may be separated at an interface 414, which may or may not be visible to a player. In addition to or in the alternative examples, a single display or three or more displays are used. Further, although illustrated as being curved, in some examples one or more of the displays are planar.

The lower curved display screen 402 transitions to player tracking area on VBD 406 via an interface 409, the VBD 406 may include a physical or floating bash button 407 for use in the gaming machine 400, as well as lighting effects, such as for peripheral lighting elements. Gaming machine 400 further includes a candle 404 integrated with gaming cabinet 412, which may further include cabinet lighting, such as an upper or upper edge lighting feature 408 and/or a lateral or side edge lighting feature 410. The cabinet lighting may be one of a variety of dynamic features capable of changing color, tempo, intensity, etc., such as in response to a user's gaze. Further dynamic features may include physical reels, such as a physical reel game coordinated with the eye gaze tracking system 401.

One or more virtual features can be presented on displays 402, 402A, and/or VBD 406. For example, the virtual features may include a reel 416 with one or more individual reels 418, as well as text and/or game icons 420, 422. In some examples, the text and/or game icons 420, 422 of the display can include one or more of a game symbol, a game icon, a virtual reel, a symbol on a virtual reel, a video poker card or game, and/or a player interface, as a list of non-limiting examples.

In some examples, the eye gaze tracking system 401 can be incorporated into an existing gaming system (e.g., an EGM) for tracking a player's eye movement and controlling features of the system accordingly. In some examples, the eye gaze tracking system is in communication with a controller of an associated system (e.g., control circuitry of the EGM) and/or a remote controller (e.g., a game controller) in order to coordinate system operation with information from the eye gaze tracking system. When control of the display is coordinated with the eye gaze tracking system, a variety of animations may be presented and modified, often more than one simultaneously, to indicate an event during gameplay. For example, a player's focus corresponding to a user input (e.g., a lingering gaze, selection of a symbol, etc.) may trigger an outcome, such as changes in a feature of the gaming cabinet and/or the display(s). The different features can be controlled to exhibit dynamic images, text, and/or animations (e.g., changes in intensity, color, speed, selective illumination, pulsing, presentation of selectable options, etc.), such as in response to the trigger. In some examples, whether a particular feature corresponds to a specific game and/or event associated with gameplay (e.g., a large wager, a jackpot award, etc.) may further indicate the outcome. The eye gaze tracking system 401 may collect information associated with the player's focus, including a posture of the player (e.g., sitting, standing, walking), a distance from the eye gaze tracking system and/or a feature, what drew the player's focus (e.g., a physical feature, a particular image or animation, etc.) and/or for how long, as a list of non-limiting examples.

In some examples, an order, timing, or synchronization of the changing features and/or lighting effects are predetermined, whereas in other examples the rules governing such changes are randomly selected (such as via a RNG call). For example, the controller (e.g., via game controller 202) can control changes in the one or more features (e.g., virtual and/or physical) to activate a random number generator call in response to the trigger event, to select a change (e.g., animation, movement, illumination, size, etc.) from a list of available options and/or sequences (e.g., proceeding through an ordered list of dynamic changes based on timing), which may be based on one or more characteristics of the trigger event (e.g., corresponding to a player selection, a particular game, etc.), and control the one or more displays to present one or more changes in accordance with the trigger event.

In some examples, near or adjacent features may be controlled together to provide entertainment and/or gaming opportunities to a player, in response to the eye gaze tracking system 401 detecting or identifying the focus of the eye gaze and subsequently instructing the gaming system. Each feature may respond to individual eye gaze inputs and/or may operate in concert with one or more other eye gaze inputs, such as eye gaze inputs associated with a related feature. In an example, an eye gaze input on a first cabinet light of a pair of cabinet lights may cause the second cabinet light to illuminate in concert with the first cabinet light. In this manner, the features may present varying options for gameplay and/or present common changes even as a particular eye gaze input is elsewhere.

Similarly, an eye gaze system (such as eye gaze tracking system 401) may be configured to control features in the broader gaming environment. Features such as lighting, signage, and/or audio devices can be arranged near an associated gaming machine (e.g., an EGM in which eye gaze tracking system 401 is not incorporated), such that a holistic environmental event can be triggered to attract and/or entertain the player. In some examples, eye gaze tracking system 401 is arranged in a central location (such as within a bank of gaming machines) and can monitor the gaming environment for players. In some examples, the centralized eye gaze system can control any number of features and/or gaming machines in the gaming environment.

In some examples, activated features are configured to follow the movement of the player and/or the movement of the player's focus. For instance, lighting and/or audible features can follow the movement, providing a personalized response, drawing further engagement from the player.

Although some examples are provided with reference to activating virtual features responsive to detecting a player's eye gaze, the disclosed systems and methods utilizing eye gaze tracking system 401 are capable of activating, deactivating, changing, and/or otherwise modifying operation of physical, dynamic features of the gaming machine 400. For instance, reel 416 may include and/or be replaced with one or more physical reels, which may operate in a manner similar to that described with respect to the virtual reel, in response to a player's eye gaze.

In some examples, one or more electromechanical actuators 424A, 424B may be associated with a particular feature of the gaming machine 400. For instance, reel 416 may be a physical reel operable to: (1) move in response to an eye gaze input, as detected and determined by eye gaze tracking system 401; and (2) rotate one or more of the individual reels 418. In some examples, a physical feature, such as button 407, may move in response to a player's action or eye gaze, such as vibrate, depress, extend, or rotate, as a list of non-limiting examples. In some examples, the reel and/or feature 416 is an electromechanical actuator and/or mechanical valve 424A, 424B, respectively, that responds to eye gaze input, as detected and determined by eye gaze tracking system 401, to spin the reels and/or provide a physical response and/or change(s). The actuators 424A, 424B may include circuitry to receive control signals from the eye gaze tracking system 401 and/or a central controller (e.g., control processor 202).

In some examples, the eye gaze tracking system 401 coordinates with one or more other user interfaces to control features of the gaming machine. For instance, a player may gaze at a particular feature to highlight the feature, such as a playing card. The player can then select the feature by touching the feature on a touch screen display, by giving a vocal command, pressing a button, pedal, and/or activating another user input device.

In some examples, employing the eye gaze tracking system 401 may simplify service of an EGM, such as when a particular user interface is unavailable or unresponsive. For instance, in the event a touchscreen display fails to receive user inputs and/or present user information, a connected eye gaze tracking system may be configured to receive commands directed from a player's gaze. In some examples, the eye gaze tracking system 401 can provide a corrective action when a user attempts to provide an input which is not properly processed by the EGM.

Figure 4B:
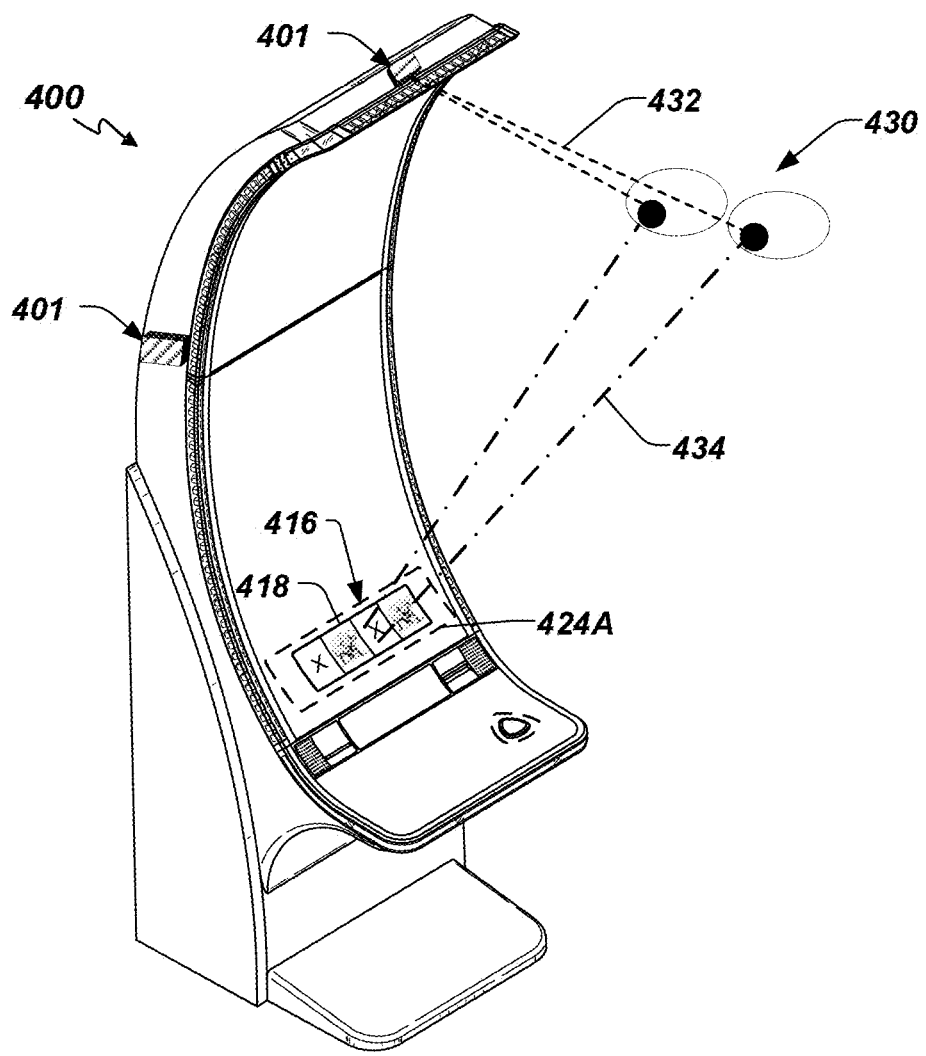
FIGS. 4B and 4C illustrate an example implementation of an eye gaze tracking system according to some aspects of the present disclosure.
Figure 4C:
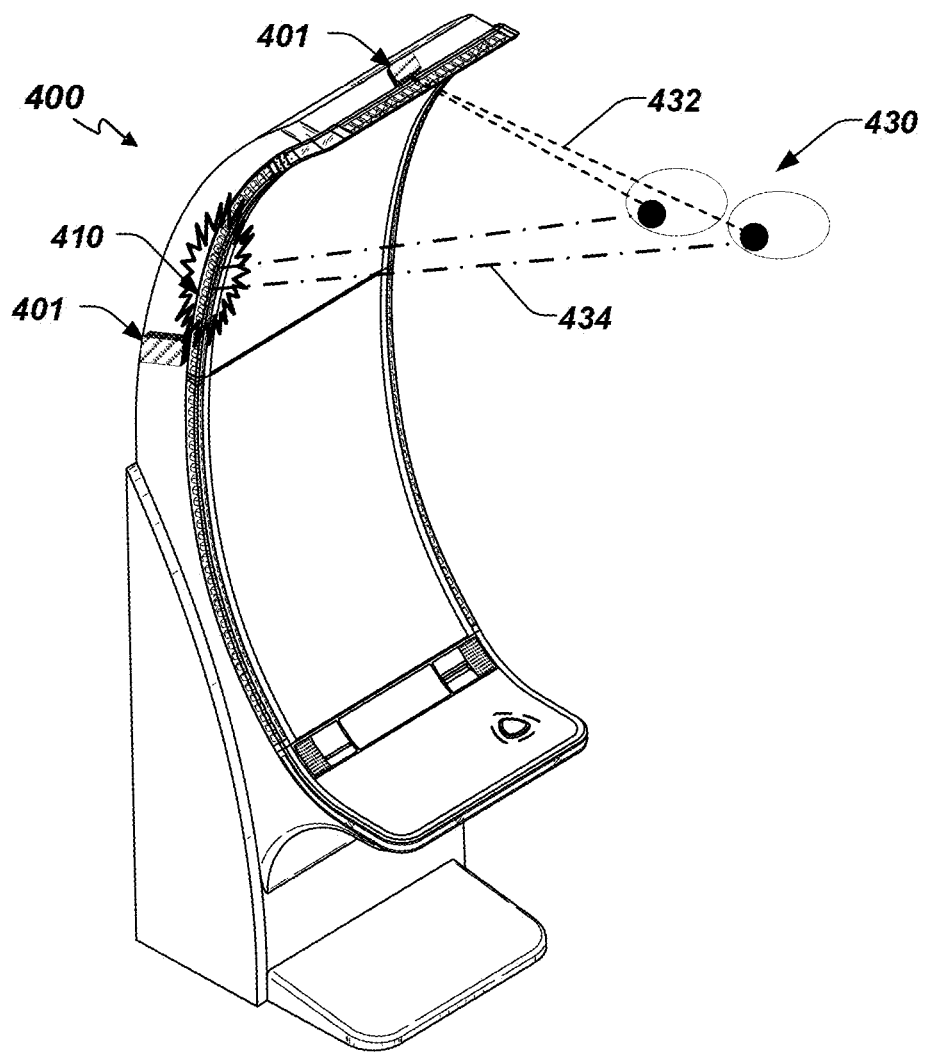

FIGS. 4B and 4C illustrate example implementations of the eye gaze tracking system 401 as disclosed herein. As shown in FIG. 4B, the eye gaze tracking system 401 monitors the gaming environment for eyes of a user 430 via a camera. The eye gaze tracking system 401 receives data 432 (e.g., reflected environmental light or light projected from the eye gaze tracking system 401 at a given wavelength) corresponding to a position of the eye (such as the pupil). The eye gaze tracking system 401 is configured to determine the focus of the eyes 430 by analysis of a number of factors, including but not limited to distance of the eyes 430 from the gaming machine 400 or display, distance between the eyes, and/or location or arrangement of the eye gaze system 401 on the gaming machine 400.

Based on the information related to the various factors, the eye gaze tracking system 401 identifies a focus of the user's gaze 434 by tracking the position of the eyes 430. As shown, the user's gaze is directed to the display 402, specifically to the reels 416. In response, the gaming machine 400 can be controlled to activate a response in one or more corresponding features, such as spinning the reels 416, changing color, or initiating audio. The eye gaze tracking system 401 periodically or continuously monitors the user's gaze, providing updates to the gaming machine 400, which adjusts a characteristic of the feature, for example, the color and/or audio, accordingly.

FIG. 4B illustrates a user's gaze 434 as directed to a feature related to gameplay. For example, the eye gaze tracking system 401 detects that the user's gaze 434 is directed to the reel 416 with the one or more individual reels 418 within the reels 416. In response, the gaming machine 400 can adjust a dynamic characteristic of the reels 416 to attract and entertain the user. Although examples are provided where the user's gaze 434 is directed to the gaming machine itself, in some examples the eye gaze tracking system 401 recognizes the user's gaze 434 as focusing on another feature in the gaming environment (e.g., a display, signage, a related gaming machine, etc.), and can communicate with a controller for such a system, initiating a response therefrom. Stated another way, a focus of the user's gaze 434 (on the gaming machine and/or gaming environment) is determined by the eye gaze tracking system 401. The user's gaze 434 can undergo a change or shift, as detected by the eye gaze tracking system 401, which initiates the response by the system to change the feature with respect to reels 416.

FIG. 4C illustrates a user's gaze 434 as directed to a feature unrelated to gameplay. For example, the eye gaze tracking system 401 detects that the user's gaze 434 is directed to a lighting feature 410 of the gaming machine 400. In response, the gaming machine 400 can adjust a dynamic characteristic of the lighting feature 410 (such as a color, pulse, movement, intensity, etc.) to attract and entertain the user. Although examples are provided where the user's gaze 434 is directed to the gaming machine itself, in some examples the eye gaze tracking system 401 recognizes the user's gaze 434 as focusing on another feature in the gaming environment (e.g., a display, signage, a related gaming machine, etc.), and can communicate with a controller for such a system, initiating a response therefrom. Stated another way, a focus of the user's gaze 434 is determined by the eye gaze tracking system 401. The user's gaze 434 can undergo a change or shift in the focal point, as detected by the eye gaze tracking system 401, which initiates the response by the system to change the feature with respect to the dynamic characteristic.

Figure 4D:
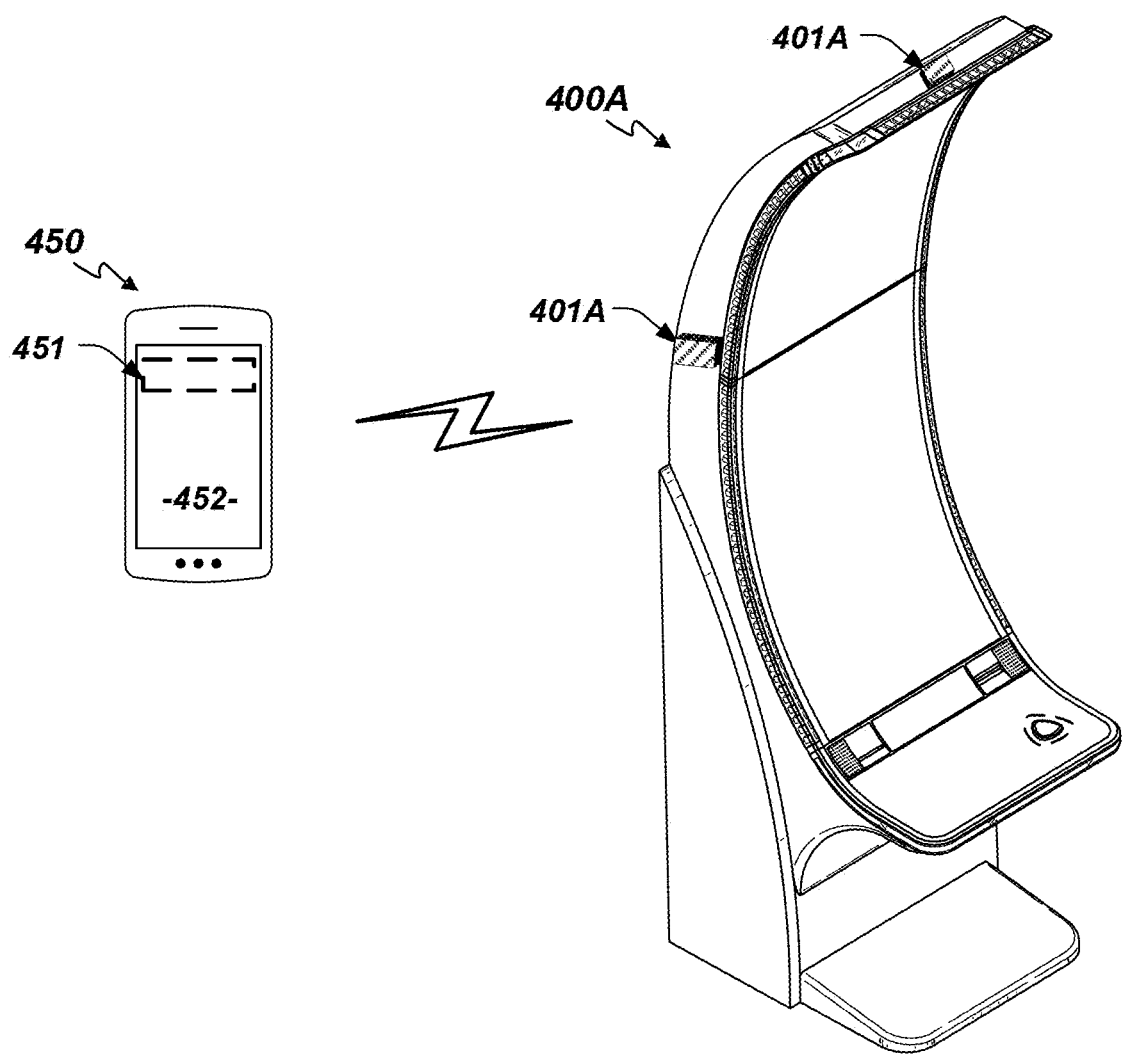
FIG. 4D illustrates a mobile device employing an eye gaze tracking system according to some aspects of the present disclosure.

Although some example systems or gaming machines employing the disclosed eye gaze tracking system are described as being housed within a gaming cabinet (as shown in FIG. 4A), in some additional or alternative examples an eye gaze tracking system 451 is incorporated with a mobile device 450, such as a smartphone, tablet computer, and/or laptop computer, as provided in example FIG. 4D. The eye gaze tracking system 451 may access an embedded and/or connected camera, and employ one or more algorithms to determine a focus of a player's eye gaze. This can include an identification of the player's eye(s), the focus of the gaze, and/or changes in the focus (e.g., the shift in focus). For instance, the eye gaze tracking system 451 may determine where the focus is on a display screen 452 associated with the mobile device 450, and/or within the player's environment.

The mobile device 450 may use information from the eye gaze tracking system 451 to enhance play of a mobile game, as disclosed herein. The mobile device 450 may be introduced into a gaming environment, which may include a gaming machine 400A. The mobile device 450 may be configured to communicate with the gaming machine 400A, such that progress in the mobile game can be recognized and attributed to the gaming machine 400A for continued play. This attribution may include the focus of the player's gaze, which may work in concert with the gaming machine 400A, which may include another eye gaze tracking system 401A. In some examples, game progress transferred to gaming machine 400A can result in increased bonuses and/or access to special features for the game continuing on the gaming machine 400A. In some examples, the gaming machine 400A can transfer a game and progress thereof to the mobile device 450.

Figure 5:
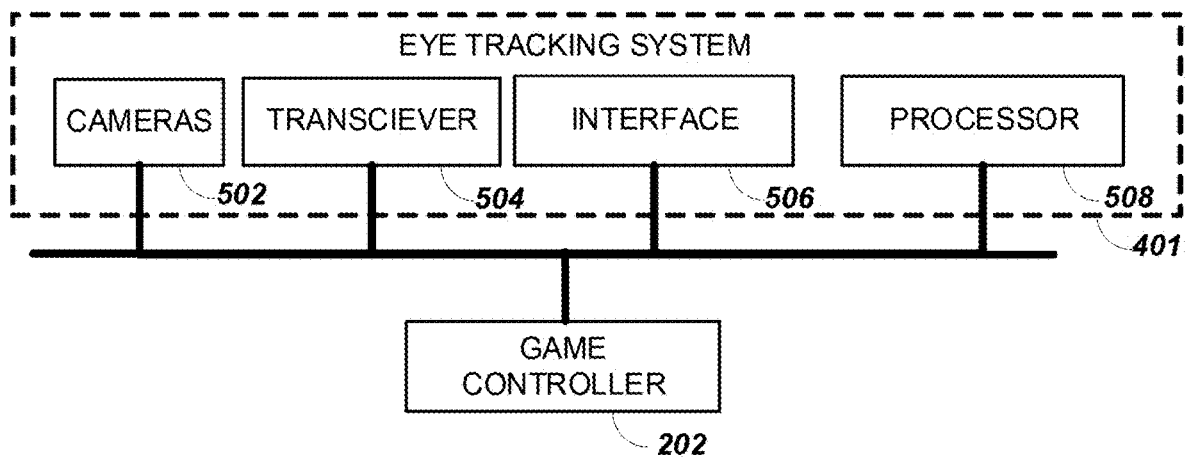
FIG. 5 illustrates an example eye gaze tracking system according to some aspects of the present disclosure.

FIG. 5 illustrates example components and/or circuitry to provide power, control, and/or transmit information for eye gaze tracking system 401. The eye gaze tracking system 401 can include one or more cameras 502, a wireless transceiver 504, a network interface 506, and/or a control processor 508. The circuitry may be housed within or to the frame 412, linked to other computing platforms, such as controller 202 of gaming machine 400, an external system (e.g., dynamic features within the gaming environment), remote server, remote control (e.g., to provide instructions, content, etc.) and/or remote displays (e.g., to provide information to the player and/or respond to player commands).

For example, the camera 502 may be configured to detect a variety of lighting types, wavelengths and/or spectra. The camera 502 may additionally or alternative include one or more sensors (e.g. optical sensor) to capture information regarding position or motion of the player's eye. The information received can be used to determine a focus of the user's gaze, which can include spatial coordinates (e.g., x, y, and z) on the gaming system and/or related features. Eye gaze and eye motion tracking may include an eye gaze input (e.g., position of the eye relating to focus), eye gesture or movement inputs (e.g., as the user's gaze scans the gaming machine and/or environment). For instance, based on a relative position of the user's eyes, the eye gaze tracking system 401 is capable of determining where the user's focus is directed.

In some examples, the controller 202 identifies coordinates on the display device 402 corresponding to the user's eye gaze data generates a coordinate map within the user's field of view. This mapping is used to determine the eye gaze of the user relative to the gaming environment. The control processor 508 may be operable to communicate with the gaming machine 400 (or other associated systems and/or devices), and/or coordinate presentation and/or changes to game icons, text, images, game symbols, and/or timing of certain actions (e.g., activate and/or deactivate in response to a user gaze input, timing, etc.). For instance, the control processor 508 may receive an input associated with an eye gaze, and transmit this information to the controller 202 to coordinate activation of a feature (e.g., lighting arranged on, and controlled by, the gaming machine 400). The control processor may also receive an input from the controller 202 and/or another sensor (e.g., a touchscreen, button, voice command, etc.). This additional or alternative inputs may be used in cooperation with the eye gaze tracking system 401 to determine a desired response. For instance, an input from another sensor or user interface may activate an eye gaze system in a power saving mode.

Figure 6:
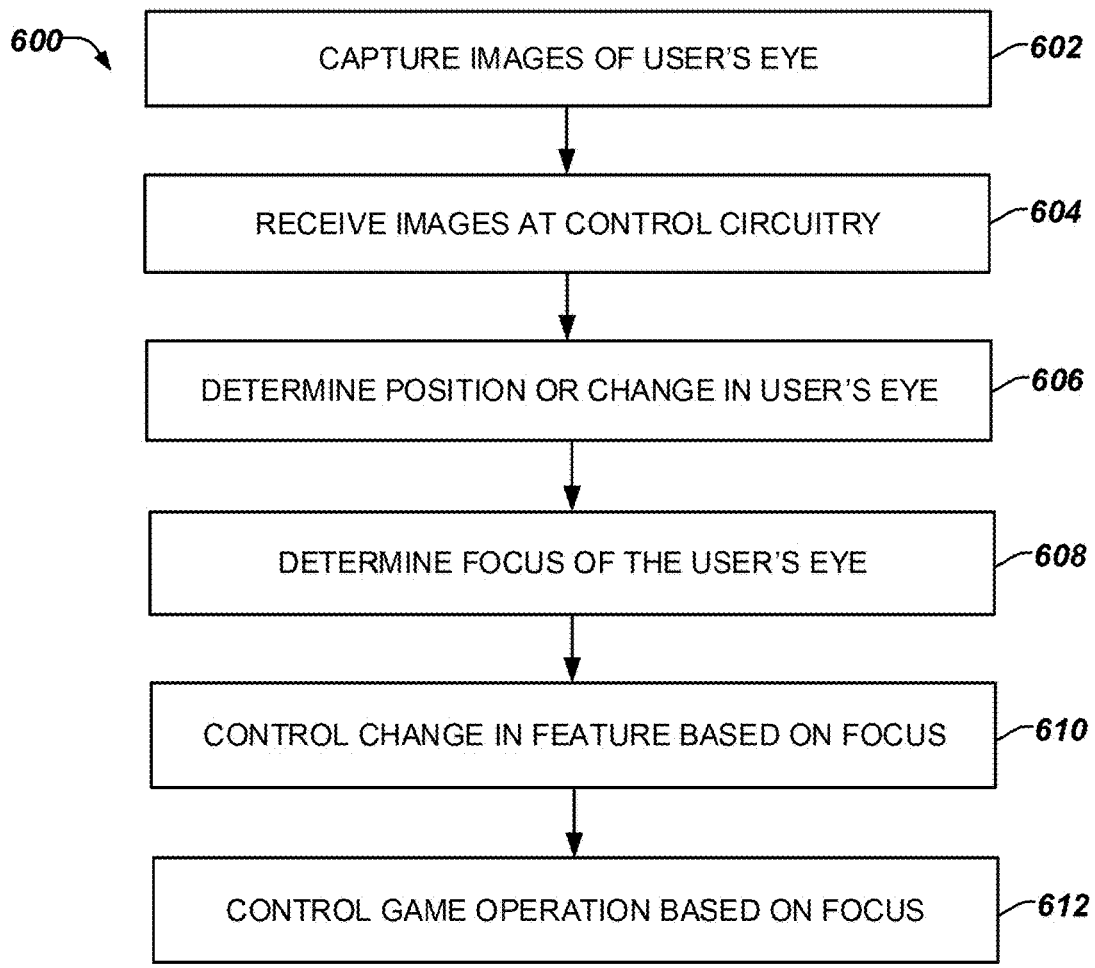
FIG. 6 is an exemplary method for employing an eye gaze tracking system according to some aspects of the present disclosure.

FIG. 6 provides a method 600 for employing an eye gaze tracking system, as disclosed herein. In block 602, a camera of the eye gaze tracking system captures images associated with a user's eye to detect a gaze and/or movement of the user's eye. In block 604, control circuitry (e.g., control circuitry 202, processor 508, etc.) receives the images. In block 606, the control circuitry determines a position or a change in position of the user's eye. In block 608, the control circuitry determines a focus of the user's eye on the text or icons of the display or the dynamic features of the gaming cabinet based on the position or change in position of the user's eye. In block 610, the control circuitry controls the text, the icons, or the dynamic features to change based on the focus of the user's eye. In some additional or alternative examples, the control circuitry is further configured to control operation of the game based on the focus of the user's eye, such as to select a wager, control a game outcome, and/or select or control a service related component of the gaming machine, as shown in block 612.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. An electronic gaming system comprising:
   eye gaze tracking system operable to detect movement of an eye of a user;
   a display to present text or icons to the user;
   a gaming cabinet including one or more dynamic features; and
   control circuitry operable to:
   receive one or more images of the user's eye;
   determine a position of the user's eye;
   identify one or more sections of the display or the one or more dynamic features of the gaming cabinet to which the user's eye is directed based on the position of the user's eye, wherein the sections include one or more of the text or the icons of the display, and the gaming cabinet includes the one or more dynamic features; and
   change the text, the icons, or the one or more dynamic features, based on the identified one or more sections of the at least one of the display or the dynamic feature of the gaming cabinet to which the user's eye is directed.

2. The system of claim 1, wherein the control circuitry is further operable to:
   determine if the user's eye is directed towards a dynamic feature of the one or more dynamic features; and
   responsive to determining the user's eye directed towards the dynamic feature, control a characteristic of the dynamic feature;
   associate a focal point with the user's eye directed towards the dynamic feature;
   determine if there is a change in the focal point; and
   responsive to determining the change in the focal point, change the dynamic feature.

3. The system of claim 2, wherein the one or more dynamic features include cabinet lighting, a button, a physical reel, or a player interface.

4. The system of claim 3, wherein the one or more dynamic features are operable to change a position, an orientation, a color, a level of illumination, a pattern of illumination, or speed of movement.

5. The system of claim 1, wherein the eye gaze tracking system is further operable to perform a calibration operation to determine an initial position of the user's eye.

6. The system of claim 1, wherein the one or more text or icons include one or more reels provided on the display, the control circuitry operable to:
   determine if the user's eye is directed towards a reel of the one or more reels;
   responsive to determining the user's eye is directed towards the reel, changing a characteristic of the reel;
   associate a focal point with the user's eye directed towards the reel;
   determine if there is a change in the focal point; and
   responsive to determining the change in the focal point, change the characteristic of the reel.

7. The system of claim 6, wherein the characteristic of the reel of the one or more reels is one of a position, an orientation, a color, a level of illumination, a pattern of illumination, or speed of movement.

8. The system of claim 1, wherein the one or more text or icons include one or more reels provided on the display, the control circuitry further operable to:
   determine if the user's eye is directed towards a first reel of the one or more reels;
   responsive to determining the user's eye is directed towards the first reel, control a characteristic of the first reel;
   determine if the user's eye is moving from the first reel of the one or more reels to a second reel of the one or more reels; and
   responsive to determining the user's eye moved from the first reel to the second reel, control a characteristic of the second reel; and
   responsive to controlling the characteristic of the second reel, change the characteristic of the second reel.

9. The system of claim 1, wherein the eye gaze tracking system comprises one or more cameras.

10. The system of claim 9, wherein the eye gaze tracking system is arranged on the cabinet such that the one or more cameras are within line of sight of the user's eye.

11. The system of claim 1, further comprising an electromechanical actuator in connected to the one or more dynamic features, the electromechanical actuator operable to vibrate, depress, extend, or rotate in response to a focus of the user's eye on a corresponding dynamic feature.

12. The system of claim 1, wherein the text or icons of the display include a game symbol, a game icon, a virtual reel, a symbol on a virtual reel, a video poker card or game, or a player interface.

13. An electronic gaming machine comprising:
a display screen to present text or icons;
a gaze tracking system operable to recognize a user's eyes at a range of angles measured from a surface of the display screen;
control circuitry operable to receive and process data from the gaze tracking system; and
a control processor operable to execute instructions based on the recognized location of the user's eye gaze, thereby controlling presentation of the text or icons on the display screen.

14. The electronic gaming machine of claim 13, wherein the range of angles span from approximately 90 to 270 degrees as measured from a plane passing through the eyes and the display screen.

15. The electronic gaming machine of claim 13, wherein the control processor is operable to execute instructions to alter a location or state of the text or icons displayed on the display screen.

16. The electronic gaming machine of claim 13, wherein the control processor is operable to execute instructions to filter out non-human eye stimuli and identify human eyes from data received from the gaze tracking system.

17. An electronic gaming device with an eye gaze tracking system comprising:
a display screen to present text or icons;
a gaze tracking system operable to recognize a user's eyes;
a game controller comprising a processor and memory, the memory storing program code including instructions, the game controller executing the instructions which cause the game controller to, at least:
capture images of the user's eyes via a camera of the eye gaze tracking system;
analyze the images to detect a focus of the user's eye or movement of the user's eyes;
determine a position of the user's eyes;
identify a focal point of the user's eyes on the display screen based on the determined position; and
adjust what is displayed on the display screen based on the identified focal point.

18. The electronic gaming device of claim 17, wherein adjusting what is displayed on the display screen comprises selecting a menu item including options corresponding to text or icons corresponding to the identified focal point.

19. The electronic gaming device of claim 17, wherein adjusting what is displayed on the display screen comprises controlling a cursor position on the display screen based on the identified focal point.

20. The electronic gaming device of claim 17, wherein adjusting what is displayed on the display screen comprises spinning, illuminating, changing a size of text or icons on the display screen based on the identified focal point.

* * * * *